Sept. 30, 1924.  
J. F. O'CONNOR  
1,510,334  
FRICTION SHOCK ABSORBING MECHANISM  
Filed Aug. 31, 1922  
2 Sheets-Sheet 1
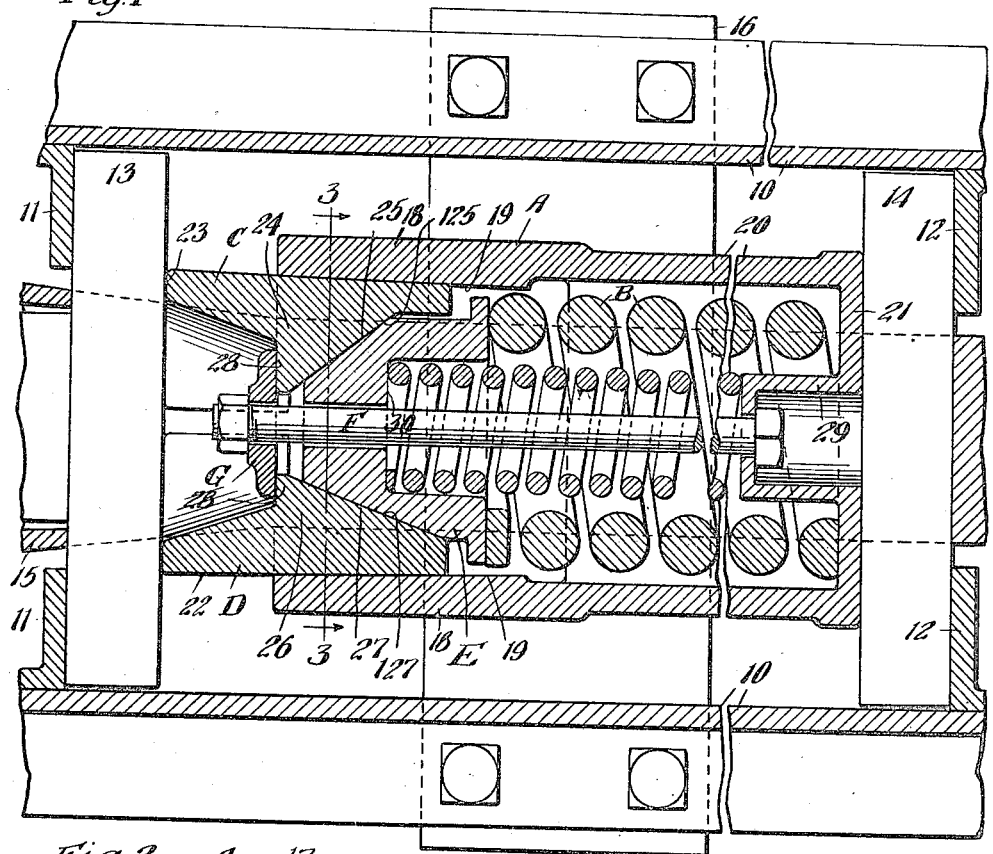
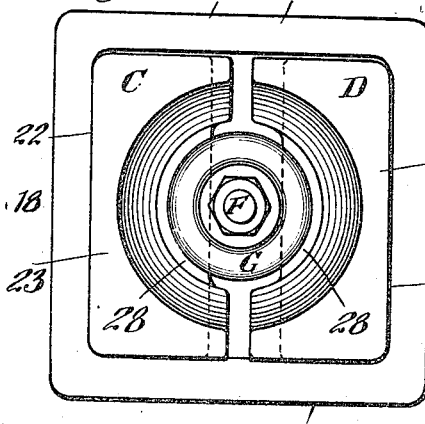
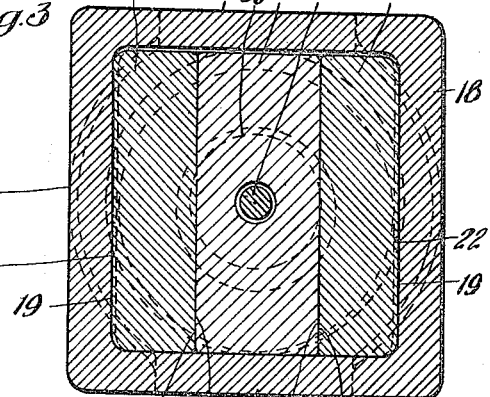
Witnesses  
Wm. Geiger
Inventor  
John F. O'Connor  
By Geo. I. Haight  
His Atty.

Sept. 30, 1924. 1,510,334
J. F. O'CONNOR
FRICTION SHOCK ABSORBING MECHANISM
Filed Aug. 31, 1922 2 Sheets-Sheet 2
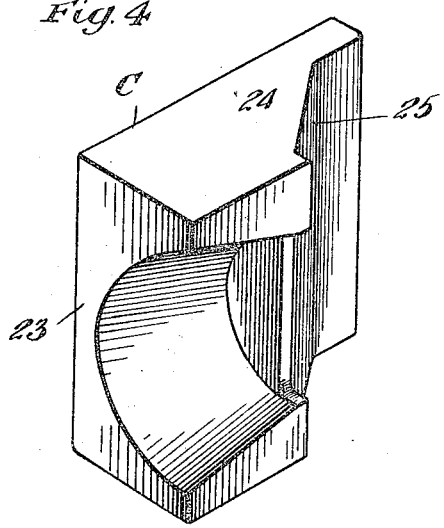
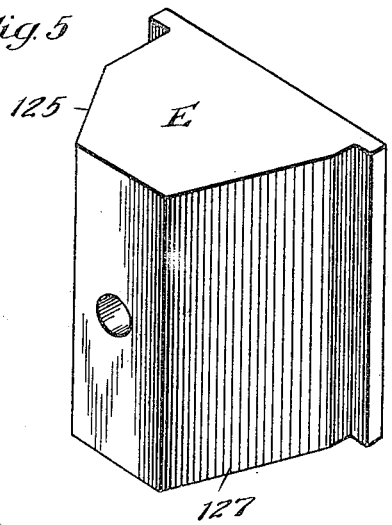
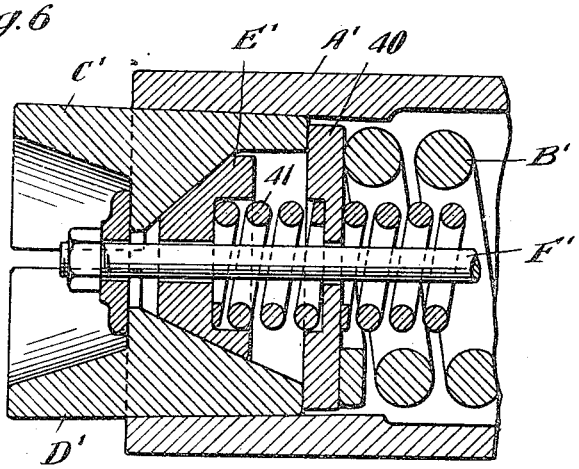
Witnesses
Wm. Geiger
Inventor
John F. O'Connor
By Geo. I. Haight
His Atty Patented Sept. 30, 1924.

1,510,334

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 31, 1922. Serial No. 585,447.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings, wherein are obtained high capacity and certain release, the friction elements being of simple and economical design.

A more specific object of the invention is to provide a mechanism of the character above indicated wherein are employed pressure-transmitting friction shoes, a wedge cooperable therewith in such manner that high capacity is induced by one set of cooperating faces and release is insured by another set of cooperating faces, the arrangement also being such that lateral adjustment of the friction shoes as they enter a tapered friction shell, is properly allowed for without danger of binding or sticking.

In the drawings forming a part of this specification, Figure 1 is a horizontal longitudinal sectional view of a portion of a railway draft rigging showing my improvements in connection therewith, parts being broken away in order to avoid crowding on the sheet. Figure 2 is a front end elevation of the shock absorbing mechanism proper. Figure 3 is a vertical transverse section view taken substantially on the line 3—3 of Figure 1. Figure 4 is a detail perspective of one of the pressure-transmitting wedge-shoes employed in the mechanism. Figure 5 is a detail perspective of the wedge employed in the mechanism. And Figure 6 is a longitudinal sectional view of a portion of a shock absorbing mechanism showing a somewhat different embodiment of the invention.

In said drawings, 10—10 denote the usual channel draft sills of a car underframe to the inner faces of which are secured front stop lugs 11 and rear stop lugs 12. The shock absorbing mechanism proper, hereinafter described, and front and rear followers 13 and 14 are disposed within a hooded cast yoke 15 by which the mechanism is adapted to be operatively associated with the drawbar. The yoke and parts therewithin are supported in operative position by a detachable saddle plate 16.

The improved shock absorbing mechanism proper, as shown, comprises a combined friction shell and spring cage casting A; a spring resistance B; a pair of pressure-transmitting wedge-friction-shoes C and D; a wedge E; a retainer bolt F; and a washer G.

The casting A is of rectangular form at its outer end, where the friction shell is located, the same having top and bottom walls 17—17 and side walls 18—18, the latter being provided on their inner faces with longitudinally extending friction surfaces 19—19 which are converged inwardly of the shell. Rearwardly of the friction shell proper, the casting A has its cross section changed to cylindrical form as indicated at 20, the latter providing a spring cage. The casting A is also formed with an integral rear wall 21, adapted to bear upon the rear follower 14.

Each of the friction shoes C and D is formed on its outer side with a longitudinally extending flat friction surface 22 adapted to cooperate with the corresponding shell friction surface 19. Said shoes C and D have outer flat ends 23 which bear directly upon the front follower 13 so that the shoes C and D are adapted to directly receive the actuating pressure. The shoe C is formed on its inner side with an inwardly extending enlargement 24 having a face 25 inclined rearwardly and away from the axis of the mechanism at a relatively blunt and releasing angle. The other shoe D is also provided with an inwardly extending enlargement 26 the latter having a face 27 inclined rearwardly and away from the axis of the mechanism at a relatively keen and true wedging angle. The enlargements 24 and 26 also provide transversely extending inwardly facing shoulders 28—28 upon which is adapted to bear the washer G when the parts are in full release or normal condition. Said washer G provides a bearing for one end of the retainer bolt F, the other end being retained by a hollow boss 29 formed integrally with the rear wall of the casting A. By this means, the parts may be held in assembled relation and the proper over-all length obtained by adjusting the nut on the bolt F.

The wedge E is provided with outwardly converged inclined faces 125 and 127 corresponding in inclination to and cooperating with the shoe faces 25 and 27 respectively. The wedge E is extended inwardly beyond the inner ends of the shoes C and D and has laterally extended flanges 29, the latter providing a bearing for the front end of the outer heavy coil of the spring B, the bearing for the inner coil of the spring B being obtained within a cup-shaped recess 30 formed on the rear side of the wedge E.

During a compression stroke of the mechanism, the operation is as follows. As the shoes C and D are moved inwardly of the shell, under the directly applied forces thereto, it is obvious that the same will move longitudinally at the same rate with respect to the shell. As the shoes move inwardly of the shell, the wedge E will be compelled to travel in the same direction and due to spring bearing upon the wedge E, a relatively high capacity wedging action will be obtained between the wedge E and the shoes due to the cooperating keen angle faces 27 and 127. The radial pressure between the shoe D and the shell will have an equal reaction between the shoe C and the shell, due to the opposed relation of the shoes and shell friction surfaces. As the shoes move inwardly, due to the taper of the shell surfaces 19, there will be a certain amount of lateral approach of the shoes C and D which will be compensated for by a squeezing out of the wedge E therebetween, this action being facilitated by the blunt angle faces 25 and 125. In this connection, it will be appreciated that the wedge E may be squeezed out slightly from between the shoes C and D, due to the relatively large included angle between the two shoe faces 25 and 27, this action being obtained without impairment of the high capacity-creating action of the keen angle faces 27 and 127 and without impairment of the easy releasing action of the blunt angle faces 25 and 125. Upon removal of the actuating force, the initial release takes place upon the inclined faces 25 and 125.

Referring now to the construction illustrated in Figure 6, the combined friction shell and spring cage casting is indicated at A'; the two friction shoes at C' and D'; the wedge at E'; the main spring resistance at B'; and the retainer bolt at F'. In the form shown in Figure 6, a spring follower 40 is interposed between the main spring resistance and the inner ends of the shoes C' and D' and also an auxiliary or supplemental spring 41 is interposed between said follower 40 and the wedge E'. The arrangement of the friction shell surfaces, shoes C' and D', and keen blunt sets of cooperating faces between the wedge E' and shoes D' and C', is the same as that in the form previously described. In the mechanism shown in Figure 6, the shoes C' and D' are resisted in what may be said to be a direct manner by the spring resistance B', as they are forced inwardly of the shell. In addition, a lateral spreading or wedging action is obtained by reason of the wedge E', the latter being adapted to yield somewhat more readily as the shoes C' and D' are moved laterally toward each other, than in the case of the wedge E of the first described form, inasmuch as the wedge E' is acted upon by a relatively light spring. Otherwise, the operation of the mechanism shown in Figure 6 is substantially the same as that of the mechanism shown in the other figures and previously described.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring resistance; pressure-transmitting wedge-friction-shoes cooperable with the shell; and a wedge-spring-follower between said shoes and spring resistance, said wedge-spring-follower and shoes having cooperating sets of outwardly converged faces, some of said faces extending at a keen angle and others at a blunt angle to the axis of the mechanism.

2. In a friction shock absorbing mechanism, the combination with a friction shell; of a spring resistance; pressure-transmitting wedge-friction-shoes cooperable with the shell; and a wedge between said shoes and spring resistance, said wedge and shoes having cooperating sets of outwardly converged faces, some of said faces extending at a keen angle and others at a blunt angle to the axis of the mechanism.

3. In a friction shock absorbing mechanism, the combination with a friction shell having interior opposed friction surfaces converged inwardly of the shell; of a spring resistance; opposed pressure-transmitting wedge-friction-shoes cooperable with said shell; and a wedge between said shoes and spring resistance, said wedge and shoes having cooperating sets of outwardly converged faces, some of said faces extending at a keen angle and others at a blunt releasing angle to the axis of the mechanism.

4. In a friction shock absorbing mechanism, the combination with a friction shell having opposed friction surfaces; of a spring resistance; opposed pressure-transmitting wedge-friction-shoes cooperable with said shell; and an outwardly tapered wedge engaging the inner ends of said shoes, said wedge and one shoe having blunt releasing angle engagement, and said wedge and the opposed shoe having keen wedge angle engagement.

5. In a friction shock absorbing mechanism, the combination with a friction shell having interior opposed friction surfaces converged inwardly of the shell; of a pair of opposed wedge-friction-shoes cooperable with said shell and adapted to directly receive the actuating pressure; a wedge disposed inwardly of said shoes, said wedge having outwardly converged inclined faces cooperable with the shoes, the cooperating faces of said wedge and shoe on one side of the axis extending at a blunt angle with respect to the axis, the cooperating faces of the wedge and the other shoe on the other side of the axis extending at a keen angle with respect to the axis; and a spring resistance operative between said shell and friction elements, said spring having direct bearing upon said wedge.

In witness that I claim the foregoing I have hereunto subscribed by name this 11th day of August, 1922.

JOHN F. O'CONNOR.

Witnesses:
 UNA C. GRIGSBY,
 ANN BAKER.